Sept. 5, 1967     O. R. F. AF STROM     3,339,911
ELASTIC CHAIN
Filed June 1, 1965     2 Sheets-Sheet 1

INVENTOR
OSCAR R. F. AF STROM

BY *Larson and Taylor*

ATTORNEYS

Sept. 5, 1967 O. R. F. AF STROM 3,339,911
ELASTIC CHAIN
Filed June 1, 1965 2 Sheets-Sheet 2

INVENTOR
OSCAR R. F. AF STROM

BY *Larson and Taylor*

ATTORNEYS

United States Patent Office 3,339,911
Patented Sept. 5, 1967

3,339,911
ELASTIC CHAIN
Oscar R. F. Af Strom, ICAO (UN) T.A. Mission,
P.M.B. 12608, Lagos, Nigeria
Filed June 1, 1965, Ser. No. 460,390
Claims priority, application Sweden, Mar. 18, 1965,
3,512/65
9 Claims. (Cl. 267—69)

ABSTRACT OF THE DISCLOSURE

The invention relates to a resilient chain, comprising a plurality of elastomeric links, means joining each elastomeric link to the next adjacent elastomeric link, and a stiff rod member in each link, disposed at least substantially normal with respect to the longitudinal axis of the chain and of a length sufficient to place the elastomeric material at each link under tension. Resilient chains so constructed achieve predictably accurate elastic extensions under load and substantially full recovery under no-load conditions.

---

The invention relates to a resilient member. More particularly, the invention relates to such a member adapted for use as a scale, and also for other purposes.

In many fields of technology a device is needed which is elastic in the longitudinal direction. Hitherto, such devices have mainly consisted of a helical spring or of a tape of an elastomer, for example rubber. However, helical springs and elastomer tapes have certain disadvantages. Helical springs only permit a relatively small extension without losing the direct ratio between the extending force and the extension; further, a fairly modest extension of a helical spring in excess of its proportional range often results in permanent changes in the properties of the spring. This may result in deformations, comparable to kinks, wherein the various turns of the spring will no longer be located at equal distances in relation to each other. An elastomeric tape cannot be stretched in excess of a relatively limited tension, which normally is insufficient for most purposes. If the stretching exceeds this limit, the rubber tape is liable to break. In some cases, the rubber tape will break entirely and then the scale is rendered useless. In other cases, internal breakages may arise which are not readily detected and which may result in non-uniform and imprecise stretching.

The present invention is directed towards an elastic member achieving elastic extensions of high accuracy and substantially complete return of the chain to its original state when the strain ceases.

Results of this kind are very desirable within many branches of technology. Examples are devices for gearing with variable gear in instrument technology and light machine technology, the arrangement of proportional governing of electric resistance values in automation technology, and devices for weighing light-weight goods. Of particular importance is the application of the invention to an elastically changeable weighing scale.

It has previously been proposed to produce stretchable scales to provide a uniform elastic stretching of the element which forms the scale. It has accordingly been proposed to use rubber tapes, helical springs and wave-like springs as a scale. These constructions suffer, however, from the above-mentioned disadvantages, and these become particularly important when it comes to the use of the device in a scale. Furthermore, should the loops of the spring be used as scale lines, which is convenient and for this reason often preferable, the inclination of such lines with respect to a stationary reference point will vary depending on the extent to which the spring is extended. This, of course, leads to inaccuracy. If, instead, the spring is provided with separate devices which will remain fixed with respect to a reference point irrespective of the extent of stretch, the construction becomes unreasonably complicated, expensive, and heavy.

All these circumstances result in the fact that the various known instruments which utilize a stretchable scale have poor accuracy and precision or are very costly or cumbersome.

It is an object of the present invention to provide a resilient chain which does not suffer from the above-mentioned disadvantages associated with previously known springs and elastomeric tapes. It is a further object to provide such a resilient chain for use in scales and other devices requiring accurate stretching characteristics particularly suited to weighing light loads.

These and other objects which will become apparent in view of the following detailed description of several embodiments of the invention are achieved by providing a resilient chain formed by a plurality of link members each of which may be conveniently described as being composed of two elastic arc members joined at their ends to form each link, means joining each link to the next, and spacing means located in each link associated with the arc members at the ends thereof to prevent the link members from flexing in a direction normal to the longitudinal axis of the chain.

Preferred embodiments of the invention are shown in the accompanying drawings in which.

Figure 1:
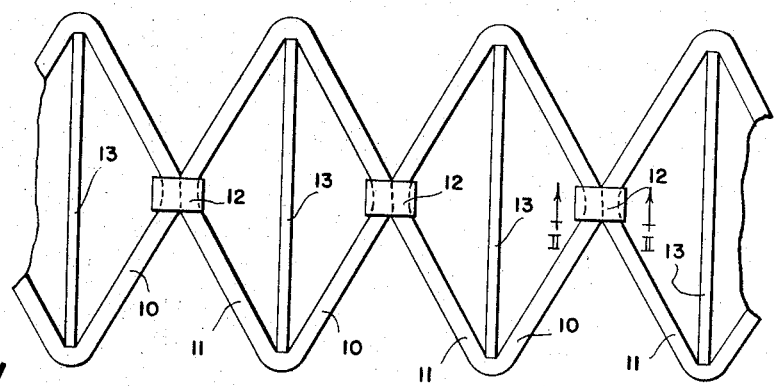
FIGURE 1 is a plan view of a resilient chain in accordance with the invention.
Figure 2:
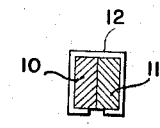
FIGURE 2 is a sectional view, along the lines II—II of a detail of FIGURE 1.

In FIGURE 1, it can be seen that a resilient chain in accordance with the present invention comprises a plurality of links made up of arc members 10, 11 and containing a spacing member 13 therein. Each link may be secured to the next adjacent link by means of a suitable clamp means 12. Preferably, the arc members 10, 11 associated with a spacing rod 13 constitute one closed loop or link of elastic material. The clamp 12 can be any suitable clamping device such as that shown in the drawings and in detail in FIGURE 2. The elastic material 10, 11, may be any well-known resilient material such as a metal spring, either in helical or wave form, or an elastomeric material such as rubber.

It is clear that a considerable extension of the scale can be obtained without the elastomer of the arcs 10 and 11 becoming subject to excessive extension. This is due to the fact that the parts which, during extension of the scale are subject to tension, move in a different direction than that of the scale itself. Thus, it is possible to obtain a large extension of the scale without placing the elastic member under excessive tension which results in increased precision.

Scale lines could be fitted in any suitable manner. For example, the rods 13 could serve as scale lines or be marked with scale lines and it is also possible to place scale lines on the clamps 12. Of course, when the chain is used as a scale and the measurement indicia is so located, it is necessary to utilize the chain with a stationary reference point.

Figure 3:
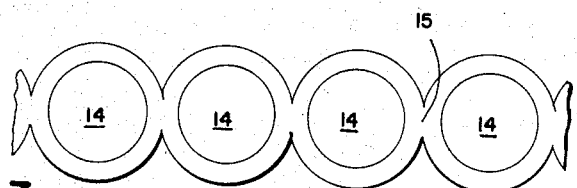
FIGURE 3 is a plan view of resilient material formed as a chain from a single integral piece of elastomeric material.

An alternative embodiment of the chain according to the present invention is shown in FIGURE 3 by which construction of the clamping means 12 is dispensed with. The elastic material of the chain is an elastomer which can either be stamped or molded by well-known techniques into a suitable form such as that shown in FIGURE 3. This comprises a series of circular links 14 joined together at 15 without the use of clamp members. Rods 13 are then inserted in each link 14 to stretch the link in a manner such that each link forms arc members 10 and 11 similar to the arc members shown in FIGURE 1.

Figure 5:
FIGURE 5 is an elevation of a second type of spacing rod useful with a resilient chain according to the invention.

The spacing rod 13 is conveniently fitted with a notch or depression 16 at either end thereof and the notch serves to retain the elastomeric link. Where the elastomeric material is of sufficient thickness (in a direction perpendicular to the plane of the drawing) that holes can be provided therein, the spacing member 13 can take the configuration shown in FIGURE 5. As shown therein, the spacing rod 13 is provided with a pin 18 at either end thereof. The pin 18 fits in a hole 17 provided in the elastomeric material 10, 11.

Figure 6:
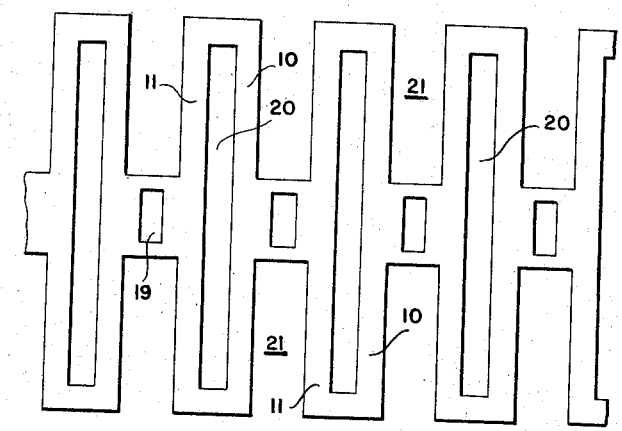
FIGURE 6 is a plan view of resilient material formed as a chain as a single integral piece of elastomeric material but having a different geometrical configuration from that shown in FIGURE 3.

Another elastic chain according to the invention and which is shown in FIGURE 6 is particularly suitable for mass production of elastic or resilient members. From a sheet of elastomer of uniform thickness a tape has been stamped (preferably between rotary stamping rollers) into the shape which is shown in the figure. It is particularly suitable that in a first motion between the rollers one stamps out the holes 19, which serve as guides in a subsequent stamping operation between a further pair of rollers, during which the slits 20 and the cuts 21 are formed. In the slits 20 one can thereafter put the rods, which suitably ought to be somewhat longer than the slits, in order than an initial tension be distributed in the links of the elastic chain, obtained through the stamping operation.

Figure 4:
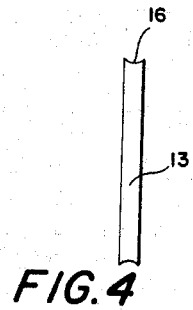
FIGURE 4 is an elevation of a spacing rod useful with a resilient chain according to the invention.
Figure 7:
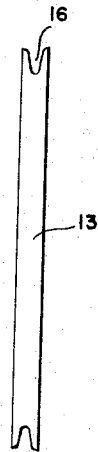
FIGURE 7 is an elevation of a third type of spacing rod useful with a resilient chain according to the invention.

The rods 13 for use with the chain shown in FIGURE 6 preferably have concave notches somewhat in the same manner as shown in FIGURE 4. The shape of the cut at the tip of the rods should, however, have the general shape of a trapezoid with a wider opening, which is wider than the thickness of the tape, and a narrower bottom, which is less than the thickness of the tape. Such a rod is shown in FIGURE 7. Through the aforementioned shape of the opening 16, it will be observed that the cross-piece of the tape will be locked in the notch, whereby a particularly stable construction is obtained.

Figure 8:
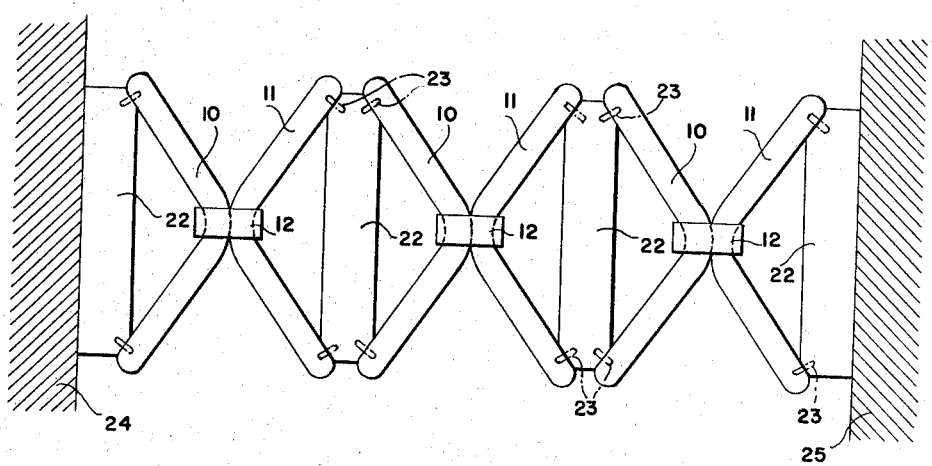
FIGURE 8 is a plan view of a bridge made in accordance with the present invention.

In addition to the aforementioned application of an elastic chain for use within the light machine technology and for scale purposes, elastic chains in accordance with the principles of the invention could also be used for many other purposes, such as for portable support bridges and, within the building industry, as a means for semi-permanent partitions. Such applications utilize the basic principle of the invention, according to which a relatively large stretching of the chain itself will result in a relatively small specified stretching of the elastomer, but, also making use of the energy which will be stored in the elastomer as a result of the stretching. This is illustrated in FIGURE 8 which shows the structural elements of a movable floating support bridge. The bridge derives its lifting force partly from floats 22 which also have the same purpose as the rods 13, and partly from the energy which has been stored into the elastomer during the stretching of the bridge. A number of floats 22 are mutually connected by means of springs or other suitable elastic members which are so arranged that the floats will have the same function as the spacing members 13 in the arrangement according to FIGURES 1–7. The springs are joined in a suitable way at the points 12 and attached to the ends of the floats by fasteners 23. Usually the floats will be situated tightly against each other due to the tension of the springs 10, 11. When the float bridge is in position between two shores 24 and 25, each of the two outermost floats is attached to shore, the springs 10 and 11 thereby being automatically extended or stretched uniformly to distribute the floats at equal distances between the two outermost floats. Thereafter one may place a bulwark over the floats. In the manner usual in floating bridges, it is desirable to sustain each separate float by means of the remaining ones, and this is achieved according to the present invention by the force from the springs 10 and 11. For certain purposes, it may be suitable to transport heavier floats separately and for this reason to make all of the springs 10, or alternatively all of the springs 11, releasable from the floats concerned.

Figures 9, 10, 11:
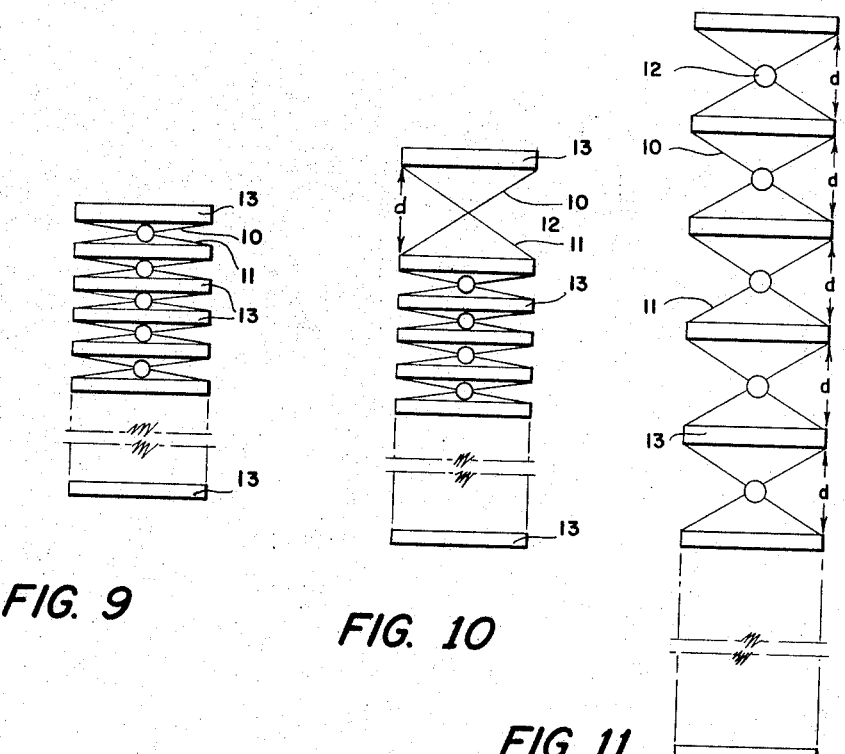
FIGURES 9–11 are elevations of a ladder incorporating an elastic chain made in accordance with the invention.

Another application which makes use of the large stretching range of the chain is a ladder illustrated in FIGURES 9, 10 and 11. Such a ladder may be used on board a ship or as a fire-escape ladder in a building. In FIGURE 9 the ladder is shown hanging freely without a load. In FIGURE 10, the ladder is shown with the second step loaded, as for example, by the weight of a person standing thereon. This load causes the step to move a distance $d$. FIGURE 11 shows the ladder when the same load is applied to the sixth step. Even though the load is distributed over the whole ladder, the distance between steps nevertheless remains substantially the same.

Although the present invention has wide applicability to several structures, it is to be again noted that the invention has particular utility in respect to scales and other devices which require members having practically constant stretching characteristics. Due to the fact that stretchable chains produced by the present invention achieve relatively large extensions without placing undue tension on the stretchable members, repeated stretching does not materially alter the stretching characteristics of the chain. This fact, especially coupled with the fact that a very light load will achieve a relatively large extension, renders the invention particularly suitable for lightweight scale devices.

What I claim is:

1. A resilient chain comprising a plurality of elastomeric links, means joining each elastic link to the next adjacent elastomeric link, and a rod member in each link disposed at least substantially normal with respect to the longitudinal axis of the chain and of a length sufficient to place the elastomeric material of each link under tension.

2. A resilient chain according to claim 1 wherein all of the links are formed from a single integral piece of elastomer.

3. A resilient chain according to claim 1 wherein said rod member has notches at each end thereof and wherein the elastomeric link member is retained in said notches in a spaced position.

4. A resilient chain according to claim 1 wherein said rod member has pin members at each end thereof and wherein the elastomeric link member has holes therein to receive said pin members to thereby retain said link member in a spaced position.

5. A resilient chain according to claim 1 wherein said rod member is provided with measurement indicia thereon.

6. A resilient chain according to claim 1 wherein said means joining the adjacent links comprises clamp means bearing measurement indicia thereon.

7. A resilient chain comprising a plurality of link members, each link member comprising a spacing member disposed normal with respect to the longitudinal axis of the chain, a first elastic arc member secured to the ends of said spacing member on one side thereof and a second elastic arc member secured to the ends of said spacing member on the opposite side thereof and clamp means securing a first elastic member of each link member with a second elastic member of each adjacent link member to form a resilient chain.

8. A resilient chain according to claim 7 wherein said elastic arc members are rubber.

9. A resilient chain according to claim 7 wherein said elastic arc members are springs.

References Cited

UNITED STATES PATENTS

| | | | |
|---|---|---|---|
| 2,277,593 | 3/1942 | Kohn | 267—73 |
| 2,678,685 | 5/1954 | Volsk | 267—1 |

FOREIGN PATENTS

| | | |
|---|---|---|
| 1,161,994 | 3/1958 | France. |
| 766,618 | 8/1951 | Germany. |
| 1,049,113 | 1/1959 | Germany. |
| 347,154 | 3/1937 | Italy. |

ARTHUR L. LA POINT, *Primary Examiner.*

R. M. WOHLFARTH, *Assistant Examiner.*